UNITED STATES PATENT OFFICE.

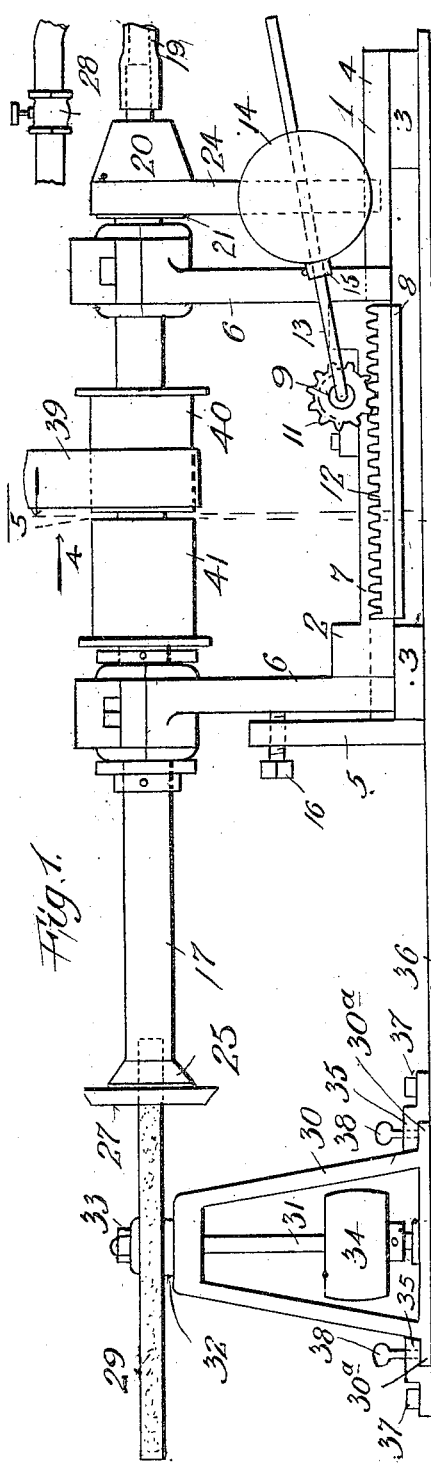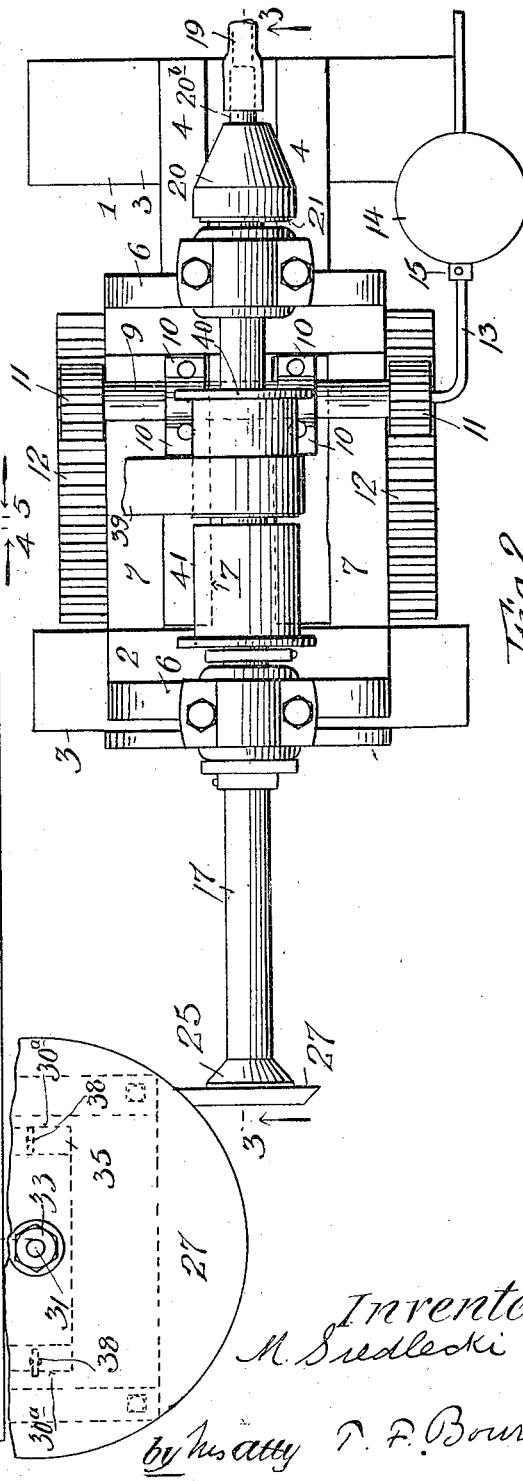

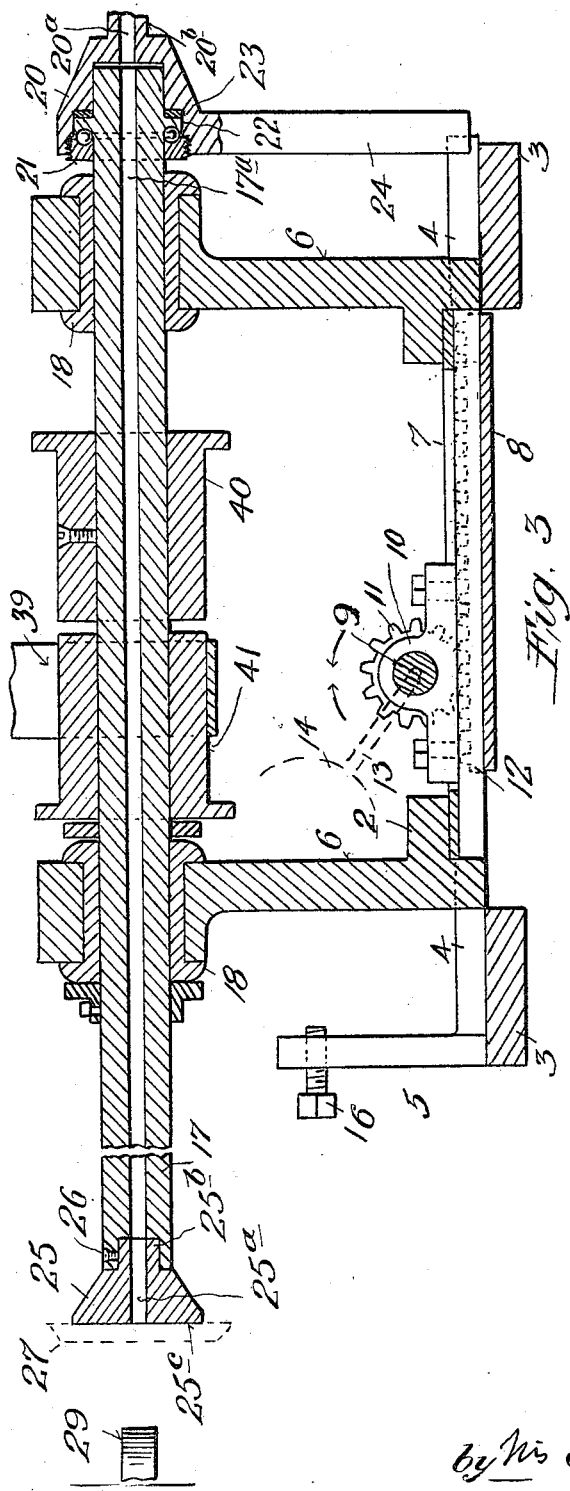

MIECZYSLAW SIEDLECKI, OF BROOKLYN, NEW YORK.

BEVELING-MACHINE.

1,285,434.

Specification of Letters Patent.   Patented Nov. 19, 1918.

Application filed March 5, 1918.   Serial No. 220,552.

*To all whom it may concern:*

Be it known that I, MIECZYSLAW SIEDLECKI, a subject of Russia, and resident of New York city, borough of Brooklyn, in the county of Kings and State of New York, have invented certain new and useful Improvements in Beveling-Machines, of which the following is a specification.

My invention has particular reference to means for holding articles, such as pieces of glass in position to be rotated in relation to a suitable tool for beveling the edges of such articles, and the object of my invention is to provide simple and efficient means to hold the articles and to present them to and remove them from operative relation to such tool, whereby articles of different diameters and thickness may be beveled as may be desired.

A leading feature of my invention comprises means to retain pieces of glass in operative relation to a stone or cutter by means of pneumatic exhaust and for such purpose I have, in the accompanying drawings, illustrated a mechanism comprising a hollow rotative shaft adapted to be connected with a source of exhaust and having a suitable head or chuck against which pieces of glass may be held through the medium of exhaust through such head or chuck, means for rotating the shaft, and means for causing the shaft to present pieces of glass successively to and remove the glass from the tool or cutter.

My invention also comprises novel details of improvement and combinations of parts that will be more fully hereinafter set forth and then pointed out in the claims.

Reference is to be had to the accompanying drawings forming part hereof, wherein:

Figure 1 is a side elevation of a machine embodying my invention; Fig. 2 is a plan view thereof; Fig. 3 is an enlarged longitudinal section substantially on the plane of the line 3, 3, in Fig. 2; Fig. 4 is a cross section on the line 4, 4, in Fig. 1; and Fig. 5 is a cross section on the line 5, 5, in Fig. 1.

Similar numerals of reference indicate corresponding parts in the several views.

A suitable base or frame is indicated generally at 1, upon which a frame indicated at 2 is mounted for movement. In the example illustrated said base comprises spaced end members 3 connected by spaced parallel guide bars 4, suitably secured thereto. An upwardly extending stop 5 is secured to one of the base members 3. Frame 2 is shown comprising spaced uprights 6 connected together by spaced bars 7 that receive the bars 4 respectively therebetween, whereby said frame is guided along the base. The bars 7 are shown provided with a plate 8 which may be secured thereto by screws, said plate extending beneath bars 4 whereby frame 2 is retained slidably upon base 1. At 9 is a shaft journaled transversely upon base 1, being shown journaled in bearings 10 secured upon the bars 4 of said base. Said shaft is provided with gears 11 in mesh with spaced racks 12 which are secured to frame 2, being shown attached to plate 8 of said frame. By the means described frame 2 may be adjusted or moved along frame 1 in one or another direction by the rotation of shaft 9. I have shown said shaft provided with a crank arm 13, having a weight 14 thereon. Said weight may be in the form of a ball, which is provided with a hole receiving arm 13, and said weight may have a screw 15 to engage arm 13 to retain the weight in adjusted position. The arrangement is such that with arm 13 in substantially the position shown in Fig. 1, the frame 2 will be resiliently pressed to the left in Fig. 1, and when arm 13 with its weight is swung over to the left in Fig. 1 shaft 9 will be rotated, and by means of its gears 11 and racks 12 will operate to adjust or move frame 2 to the right in Fig. 1, as illustrated in Fig. 3. A screw or adjustable stop 16 upon upright 5 may be operated to limit or regulate the movement of frame 2 to the left in Fig. 1.

At 17 is a hollow shaft journaled in bearings 18 upon the uprights 6 of frame 2. Said shaft is adapted to be connected with a source of pneumatic exhaust, such as any suitable exhaust pump or the like, for which purpose a flexible hose or tube 19 is shown in communication with one end of said shaft, and controllable by a valve 28. I have shown a hollow head 20 rotatively receiving the adjacent end of shaft 17, the bore 17$^a$ of which shaft is in communication with the bore 20$^a$ of said head, the projecting nipple-like portion 20$^b$ of which head is adapted to be connected with the hose 19. I have shown an anti-friction bearing 21 between head 20 and shaft 17, and a flange 22 on said shaft rotative within said head and coöperative therewith, as by means of a gasket or washer 23, (Fig. 3) for limiting the flow of air between said shaft and head. The head 20 is shown provided with an arm 24 that depends between the bars or rails 4 for adjustment along the latter with frame 2, and whereby head 20 is kept from rotation by and with shaft 17.

The opposite end of shaft 17 is provided with a head or chuck 25 having a bore 25$^a$ in communication with bore 17$^a$ of shaft 17. Said head is shown provided with a reduced end portion 25$^a$ adapted to fit in a recess in the adjacent end of shaft 17, and said head may be detachably retained on said shaft by a screw 26. By the means described heads 25 of different dimensions may be applied to shaft 17 as desired, according to the work to be accomplished. The outer end or face 25$^c$ of head 25 is flat and at right angles to the axis of shaft 17, whereby articles, such as glass plates 27, may be placed against said end or face of the head for rotation therewith. The arrangement is such that when a piece or disk of glass is placed against the flat face of the head 25 and exhaust is caused through shaft 17 the glass will be held by reason of such exhaust firmly against said head for rotation with said shaft, and when the exhaust is released the glass will be free for removal from head 25.

Any suitable means may be provided for coöperation with article or glass 27 for grinding or cutting it. In the example illustrated a tool 29, such as a cutter or stone, is located in position to coöperate with glass 27 to bevel the edge of the latter, as indicated in Figs. 1 and 2. I have shown a frame 30 having suitable bearings in which a shaft 31 is mounted, to which shaft the tool or cutter 29 is secured. Said shaft may be provided with a flange or stop 32, against which the tool may abut and with a nut 33 whereby the tool may be detachably secured to shaft 31. Shaft 31 may be rotated in any suitable manner, as by being provided with a pulley 34 to receive a belt. In order to permit operation of articles 27 of different diameters in conjunction with tool or cutter 29, the latter may be made adjustable relatively to the shaft 17 in any suitable manner. For such purpose I have shown frame 30 provided with lateral flanges 30$^a$ guided by spaced guides 35 secured upon a table or base 36, upon which table the frame 1 also may be secured. Guides 35 may be secured on said table by means of screws 37, and said guides are shown provided with screws 38 which may be suitably spaced apart and are adapted to bear against flanges 30$^a$ to retain frame 30 in set position of adjustment. By the means described tools or cutters 29 of varying diameter may be applied to shaft 31 and adjusted with frame 30 to the desired position relatively to article 27 to be beveled or cut, and in accordance with the diameter of the latter.

Shaft 17 may be rotated by means of a belt 39 from a suitable source of power adapted to operate upon a fast pulley 40 and a loose pulley 41 on said shaft. The relation of the pulleys to the belt is such that when frame 2 and shaft 17 are adjusted toward tool or cutter 29 (toward the left in Fig. 1) said fast pulley will enter the belt for rotation of the shaft, and whereby when said frame and shaft are moved away from said tool or cutter, as to the right in Fig. 1, the fast pulley 40 will move away from the belt and the loose pulley 41 will move into said belt to stop rotation of shaft 17.

In accordance with my invention arm 13 may be swung over to the left in Fig. 3, whereby the gears 11 operating with racks 12 will cause frame 2 and shaft 17 to move away from tool or cutter 29, and belt 39 will receive and operate loose pulley 41. A piece or disk of glass 27 may then be placed against head 25, and valve 28 may be operated to cause exhaust through shaft 17 and head 25 to securely retain the glass on the shaft in operating relation to tool or cutter 29, and then arm 13 may be swung over to the right in Fig. 1, whereby frame 2 and shaft 17 with the glass thereon, will be moved toward the tool or cutter to engage the glass therewith, and fast pulley 40 will enter the belt 39 for rotation of the shaft and glass. The weight 14 upon arm 13 will tend to cause glass 27 to be kept pressed, in a resilient manner, against tool or cutter 29 during rotation of the latter against the glass, whereby the latter will be fed to the cutter and kept pressed thereagainst while the beveling of the edge of the glass proceeds. When the said beveling is finished the arm 13 will be again swung to the left in Fig. 3 to withdraw shaft 17 and glass 27 from the tool or cutter, valve 28 will be closed to cut off exhaust through said shaft to release the glass and the latter may be removed ready for another like operation, and so on. It thus will be apparent that pieces of glass of varying diameter and of varying thickness may be readily and expeditiously beveled in accordance with my invention. It will be observed that the tool or cutter 29 rotates in a plane substantially in or coincident with the axis of shaft 17, and thereby in the axis of glass 27, so that the glass touches the tool or cutter in the plane of the transverse diameter of the glass, whereby the edge of the glass and the edge of the tool or cutter coöperate in an efficient manner for beveling the edge of the glass.

By means of my improvements the glass may be conveniently supported for rotation without requiring it to be gripped by tools, so that the entire edge of the glass may be beveled when desired.

Although I have referred to beveling the edges of pieces or disks of glass, it will be understood that any suitable material may be attached to shaft 17, in the manner stated, for operation of the tool or cutter thereon, and also that while I have referred to beveling the edges of pieces of glass, it will be obvious that material 27 may be presented to the cutter in such a manner as to operate upon the face thereof, instead of or as well as the edge.

While I have described a particular construction of frames 1 and 2, whereby the latter is mounted for adjustment along the former, it will be understood that any suitable form of frames may be used, and that my invention is not limited to the particular details of construction and arrangement of parts set forth, as the same may be varied, within the scope of the appended claims, without departing from the spirit of my invention.

Having now described my invention what I claim is:

1. The combination of a shaft having means to retain an article for rotation, a frame rotatively supporting the shaft, means to move the shaft longitudinally in opposite directions, and means coöperative with the shaft to rotate it when the shaft is in one position of adjustment and rendering the shaft non-rotative when it is in another position of adjustment.

2. The combination of a shaft having means to retain an article for rotation, a frame rotatively supporting the shaft, means to move the shaft longitudinally in opposite directions, means coöperative with the shaft to rotate it when the shaft is in one position of adjustment and rendering the shaft non-rotative when it is in another position of adjustment, and means to maintain the shaft under resilient pressure in one direction when it is being rotated.

3. The combination of a shaft having means to retain an article for rotation, a frame rotatively supporting the shaft, means to move the shaft longitudinally in opposite directions, said shaft having a fast and a loose pulley movable with the shaft when it is adjusted longitudinally, and a belt coöperative with said pulleys to rotate the shaft by the fast pulley when the shaft is in one position, and for non-rotation of the shaft by the loose pulley when the shaft is in another position, said pulleys being adapted to move within the belt when the shaft is adjusted longitudinally.

4. The combination of a shaft having means to retain an article for rotation, a frame rotatively supporting the shaft, means to move the shaft longitudinally in opposite directions, said shaft having a fast and a loose pulley movable with the shaft when it is adjusted longitudinally, a belt coöperative with said pulleys to rotate the shaft by the fast pulley when the shaft is in one position, and for non-rotation of the shaft by the loose pulley when the shaft is in another position, said pulleys being adapted to move within the belt when the shaft is adjusted longitudinally, and means to retain the shaft resiliently pressed in one direction with the belt in coöperation with the fast pulley.

5. The combination of a hollow shaft to retain an article for rotation by pneumatic exhaust through the shaft, a frame rotatively supporting the shaft, means adjustably supporting said frame for movement of the shaft in opposite directions, gearing to move said frame and shaft in opposite directions, means to maintain the frame in adjusted position, and means to rotate the shaft while in one position and to stop its rotation while in another position.

6. The combination of a hollow shaft to retain an article for rotation by pneumatic exhaust through the shaft, a frame rotatively supporting the shaft, means adjustably supporting said frame for movement of the shaft in opposite directions, gearing to move said frame and shaft in opposite directions, means to maintain the frame in adjusted position, an arm connected with said gearing, a weight upon said arm to retain the frame and shaft resiliently pressed in one direction, and means to rotate the shaft while in one position and to stop its rotation while in another position.

7. The combination of a hollow shaft to retain an article for rotation by pneumatic exhaust through the shaft, a frame rotatively supporting the shaft, gearing to move said frame and shaft in opposite directions, means to maintain the frame in adjusted position, said shaft having a fast and a loose pulley, and a belt for coöperation with said pulleys, the fast pulley being adapted to coöperate with the belt when the frame is in one position and the loose pulley adapted to coöperate with the belt when the frame is in another position of adjustment.

8. The combination of a hollow shaft to retain an article for rotation by pneumatic exhaust through the shaft, a frame rotatively supporting the shaft, gearing to move said frame and shaft in opposite directions, means to maintain the frame in adjusted position, said shaft having a fast and a loose pulley, a belt for coöperation with said pulleys, the fast pulley being adapted to coöperate with the belt when the frame is in one position and the loose pulley adapted to coöperate with the belt when the frame is in another position of adjustment, an arm connected with said gearing, and a weight upon said arm whereby when the arm is in one position the fast pulley will coöperate with the belt, and when the arm is in another position the loose pulley will coöperate with the belt.

9. The combination of a base, a frame adjustably mounted upon the base, a shaft journaled upon the base and provided with a gear, a frame having a rack coöperating with said gear, means to rotate said shaft for adjustment of said frame along the base in opposite directions, a hollow shaft rotatively carried by said frame and adapted to retain an article for rotation by pneumatic exhaust through the shaft, fast and loose pulleys upon said last named shaft, a belt coöperative with said pulleys to operate the fast pulley when the shaft and frame are in one position and to operate the loose pulley when the shaft and frame are in another position, a tool located in position to coöperate with an article supported by said shaft, and means to operate said tool.

Signed at New York city, in the county of New York and State of New York, this 2nd day of March, A. D. 1918.

MIECZYSLAW SIEDLECKI.